United States Patent [19]

Steinbach

[11] 4,228,595

[45] Oct. 21, 1980

[54] TOOL SETTING GAGE

[76] Inventor: Harold Steinbach, Rte. 1, Box 165 B, Menasha, Wis. 54962

[21] Appl. No.: 31,060

[22] Filed: Apr. 18, 1979

[51] Int. Cl.$^3$ .............................................. G01B 5/00
[52] U.S. Cl. .................................... 33/201; 33/1 M; 33/172 R; 33/185 R
[58] Field of Search .................... 33/185 R, 201, 1 M, 33/189, 172 R, 169 R

[56] References Cited

U.S. PATENT DOCUMENTS

| | | | |
|---|---|---|---|
| 2,666,265 | 1/1954 | Attig | 33/169 R |
| 3,059,337 | 10/1962 | Lynch | 33/189 |
| 3,218,722 | 11/1965 | Jacobs | 33/172 R |
| 3,384,970 | 5/1968 | Avalear | 33/189 |
| 3,481,247 | 12/1969 | Hayes . | |
| 3,504,442 | 4/1970 | Allen . | |
| 3,546,781 | 12/1970 | Cox et al. . | |
| 3,578,868 | 5/1971 | Workemeier . | |
| 3,597,093 | 8/1971 | Wolf . | |
| 3,920,971 | 11/1975 | Bevis et al. | 33/201 |
| 4,031,628 | 6/1977 | Kaesemeyer | 33/201 |

Primary Examiner—William D. Martin, Jr.
Attorney, Agent, or Firm—Andrus, Sceales, Starke & Sawall

[57] ABSTRACT

A tool setting gage has a base plate with a socket for receiving the tool to be set. A horizontally movable carriage is mounted on the base plate for movement toward and away from the tool socket normal to the axis of the tool. A vertically movable carriage is mounted on the horizontal carriage for up and down movement parallel to the axis of the tool. A feeler is mounted on the second carriage for contacting the cutting point of the tool responsive to the horizontal and vertical movements of the carriages. A transducer ascertains the position of the feeler and operates a digital readout for indicating the axial and radial dimensions of the cutting point.

6 Claims, 3 Drawing Figures

TOOL SETTING GAGE

FIELD OF THE INVENTION

The present invention relates to a tool setting gage or instrument.

BACKGROUND AND SUMMARY OF THE PRESENT INVENTION

In machining operations, it is often desirable or necessary to set the dimensions of a metal working tool along one or more axes. For example, when using a boring bar to bore a hole, the diameter of the hole depends on the radial distance of the cutting point from the axis of rotation of the bar or workpiece. The depth of the hole depends, at least in part, on the axial position of the cutting tool with respect to the chuck or other machine tool reference element for the bar.

It is further desirable, particularly in production operations, to rapidly and accurately set the tool, such as a boring bar or other cutting tool, to the correct dimensions. This may be done on the machine, as shown in U.S. Pat. No. 3,481,247. It may also be done off the machine. U.S. Pat. Nos. 3,578,868 and 3,597,093 show separate apparatii employing optical systems in which the tool is preset prior to insertion in the machine. After the tool has been preset, it is placed in the machine and the metal working operation performed.

However, optical systems suffer from errors in parallax, ambient lighting problems, and other shortcomings. Other tool setting apparatii use feelers employing mechanical dial indicator gages to set the cutting point, as in U.S. Pat. Nos. 3,504,442 and 3,546,781. More recently, digital transducers and readouts for tool setting gages have become available.

With such presetting gages, a master tool is typically placed in the device and the gage operated to ascertain certain radial and axial reference dimensions from the master, as by a feeler. The master tool is removed and the actual cutting tool inserted in the tool setting gage. The feeler of the gage is then used to adjust the position of the actual tool to the desired dimensions with respect to the references.

However, the construction of the prior art tool setting gages tends to be such as to limit in the size of the tool that can be set in at least on direction. This restricts the use of the gage.

It is therefore, the object of the present invention to provide an improved tool setting gage capable of rapidly and accurately setting a metal working tool over large radial and axial dimensions.

Briefly, the tool setting gage of the present invention includes a base member having a socket for receiving the tool in a generally vertical orientation. A horizontally movable carriage is mounted on the base member for coarse and fine movement toward and away from the tool socket normal to the axis of the tool. The carriage may be moved, in fine adjustment, by a rotatable lead screw. A second, vertically movable carriage is mounted on the horizontal carriage for coarse and fine up and down movement parallel to the axis of the tool. A feeler is mounted on the second carriage for contacting the cutting point of the tool responsive to the horizontal and vertical movements of the carriages. A transducer ascertains the position of the feeler and operates the digital readout for indicating the axial and radial dimensions of the cutting point.

DETAILED DESCRIPTION OF THE PREFERRED EMBODIMENT

Figure 1:
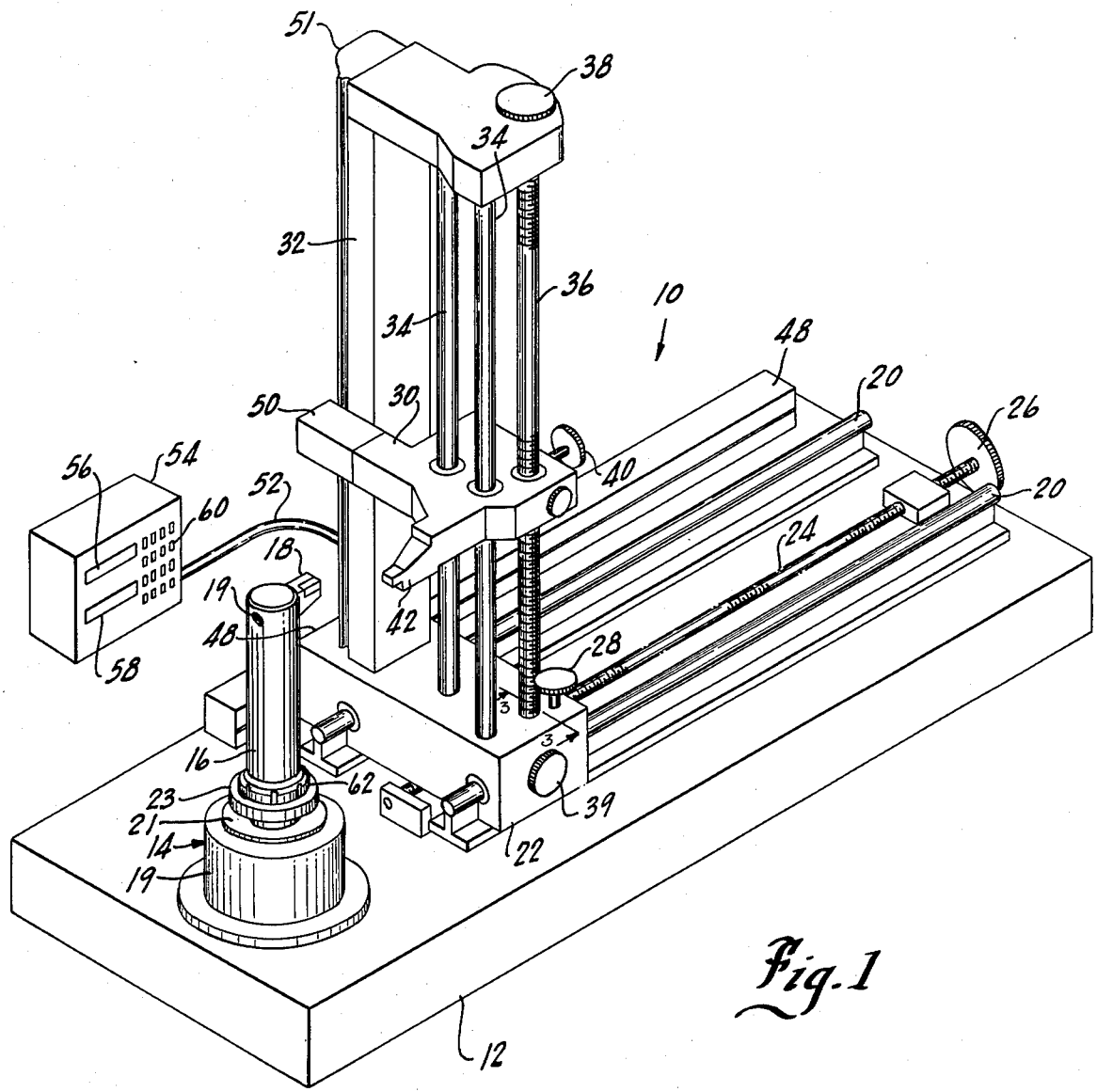
FIG. 1 is a perspective view of the tool setting gage of the present invention.

Tool setting gage 10 of the present invention includes base plate 12 containing a socket means 14 for receiving tool 16 having cutting point 18. Tool 16 is typically vertically oriented with the axis of the cutting tool running perpendicular to the upper surface of base plate 12. Socket means 14 typically includes housing 19 containing socket 21 mounted in precision bearings in the housing. Socket 21 may be sized to receive the shank of tool 16 or, as shown in FIG. 1 may be sized to receive the tool and the associated collet chuck 23. The socket may be straight, tapered, or of a special type, depending on the type of tool to be set or its collet chuck or holder.

Tool 16 is axially movable with respect to collet chuck 23 to adjust the axial length of the tool and cutting point 18 as by loosening and retightening the chuck. Adjustment screw 19 permits adjustment of the radial dimension of cutting point 18.

Figure 3:
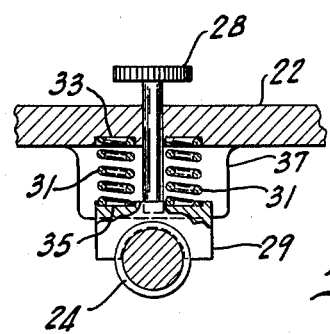
FIG. 3 is a cross-sectional view taken along the line 3—3 of FIG. 1.

Base plate 12 includes a pair of rails 20. Carriage 22 is mounted on rails 20 for horizontal movement toward and away from tool 16. Carriage 22 may be moved, in fine adjustment, by lead screw 24 mounted on base plate 12 and rotatable by knob 26. As shown in FIG. 3, a fine adjustment knob 28 extends through carriage 22 to half lead nut 29 on lead screw 24. Lead nut 29 is biased onto lead screw 24 by springs 31 seated in recesses 33, 35 on the carriage 22 and nut 29, respectively. Half nut 29 may abut back up plate 37 or other support means such as pins extending through springs 31 which prevent play in nut 29. When lead nut 29 is biased on lead screw 24, carriage 22 may be moved by rotating the lead screw to provide the small movements of carriage 22 necessary to obtain accurate measurement. For coarse adjustments, knob 28 is pulled upward, disengaging nut 29 from lead screw 24 and allowing carriage 22 to move freely on rails 20 as by grasping knob 39.

A second, vertically movable carriage 30 is mounted on carriage 22. For this purpose, arm 32 supports rails 34 and lead screw 36 on which carriage 30 is mounted. Lead screw 36 is rotated by knob 38 to vertically move carriage 30 in fine adjustment by use of knob 40 in the same manner as carriage 22.

Figure 2:
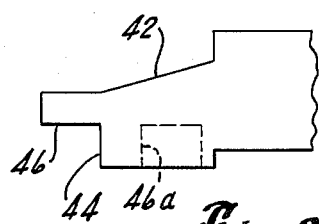
FIG. 2 is a partial side view showing the feeler element of the gage.

Carriage 30 contains feeler 42. As shown in FIG. 2, feeler 42 has a verticl gaging surface 46 and a horizontal gaging surface 44 for contacting cutting point 18 of the tool 14.

The horizontal movement of carriage 22 is ascertained by transducer 48 coupled between carriage 22 and base plate 12. Transducer 48 may be of the digital type, such as an etched glass scale on base plate 12 with a photo-optical reader head on carriage 22, a rack and pinion mechanism with a rotary encoder, or an endless tape with a rotary encoder. A similar transducer 50 is provided in connection with carriage 30 to ascertain the vertical movement of carriage 30 by coaction with glass scale 51. Transducers 48 and 50 are connected by cable 52 to digital readout 54 containing horizontal movement indicator 56 and vertical movement indicator 58.

Offset and other data may be entered into readout 54 by means of key pad 60.

In a typical usage of tool setting gage 10, a master tool is placed in a collet 23 similar to that used with tool 16. Collet 23 is placed in socket 21. Carriages 22 and 30 are moved so that vertical and horizontal gaging surfaces 44 and 46 of feeler 42 abut reference surfaces of the master tool. For example, feeler 42 is moved so that gaging surface 46 abuts the top of collet chuck 23 which serves as the gage or reference line for the axial dimension of tool 16. The vertical indicator 58 of digital readout 54 is then zeroed. Surface 44 is then moved to abut the shank of the master tool which has a known radius or diameter, for example a radius of 1.0000 inches. The horizontal indicator 56 of digital readout 54 is preset to this dimension to establish a reference with respect to the centerline of the tool. Instead of surface 44, the end of feeler 42 may be used, with an appropriate offset entered in digital readout 54. The radial dimension may be converted to a diametral dimension if desired. Carriages 22 and 30 are then backed off and the master tool removed from socket 21.

The actual cutting tool 16 is next placed in socket 21. The position of cutting point 18 is then adjusted, as by screw 19 for the radial adjustment. Axial adjustment may be obtained by nut 62 on tool 16 or its holder which bears on collet 23. This adjustment continues until cutting point 18 is in a desired position, with respect to the gage line and center line dimensions established in digital readout 54. This is done by bringing the horizontal and vertical gaging surfaces 44 and 46 of feeler 42 in contact wih cutting point 18 during the adjustment process until the cutting point has the correct dimensions as indicated by digital readout 54. Carriages 22 and 30 are then moved back from cutting tool 16, the cutting tool removed, and placed in the machine tool for use in the metal working operation.

Where inside radial dimensions are to be set, feeler 42 may be modified to provide an appropriate gaging surface, such as surface 46a shown in FIG. 2.

Through the use of rail mounted carriages 22 and 30, large radial and axial dimension of a cutting tool can be rapidly and accurately established.

Various modes of carrying out the invention are contemplated as being within the scope of the following claims particularly pointing out and distinctly claiming the subject matter which is regarded as the invention.

I claim:

1. A tool setting gage for ascertaining the radial and axial position of an element of a tool comprising:
    a base member having means for mounting said tool thereon to extend vertically above said base member;
    a first pair of spaced, parallel, horizontal rails affixed to said base member;
    a first carriage mounted on said first rails for movement toward and away from the tool mounting means normal to the extension of the tool;
    a horizontal lead screw rotatably journalled on said base member intermediate said first rails;
    a first nut mechanism mounted on said first carriage and selectively engageable with said horizontal lead screw for providing fine adjustment movement of said first carriage with respect to said tool mounting means and for retaining the first carriage in position on said first pair of rails;
    a second pair of spaced, parallel, vertical rails affixed to said first carriage;
    a second carriage mounted on said second rails for movement up and down along the extension of the tool;
    a vertical lead screw rotatably journalled in said first carriage;
    a second nut mechanism mounted on said second carriage and selectively engageable with said second lead screw for providing fine adjustment movement of said second carriage with respect to said tool mounting means and for retaining the second carriage in position on said second pair of rails;
    a feeler mounted on said second carriage for contacting the tool element responsive to movement of said first and second carriages;
    transducer means for ascertaining the movement of said carriages; and
    digital readout means coupled to said transducer means for indicating the position of said feeler.

2. The tool setting gage according to claim 1 for ascertaining the axial position of the element with respect to a reference plane and the tool has an axis lying normal to said reference plane when the tool is in said mounting means, wherein said first carriage is movable toward and away from the tool normal to its axis and said second carriage is movable up and down parallel to the axis of the tool, and wherein said digital readout means is capable of indicating the radial and axial position of said feeler with respect to the axis of the tool and the reference plane, respectively.

3. The tool setting gage according to claim 1 wherein said first and second carriages are freely movable on said rails during coarse adjustment when said first and second nut mechanisms are selectively disengaged from said first and second lead screws.

4. The tool setting gage according to claim 3 wherein said lead screw-nut mechanisms include a half nut biased into engagement with said lead screw for fine adjustment and disengageable therefrom for coarse adjustment.

5. The tool setting gage according to claim 1 wherein said feeler is so constructed as to measure external dimensions of the tool.

6. The tool setting gage according to claim 1 wherein said feeler is so constructed as to measure an internal dimension of the tool.

* * * * *

UNITED STATES PATENT AND TRADEMARK OFFICE
CERTIFICATE OF CORRECTION

PATENT NO. : 4,228,595
DATED : October 21, 1980
INVENTOR(S) : Harold Steinbach

It is certified that error appears in the above-identified patent and that said Letters Patent are hereby corrected as shown below:

On the First Page of Patent, in the inventor's address, cancel the zip code "54962" and insert---54952---

Signed and Sealed this

Fourteenth Day of April 1981

[SEAL]

Attest:

RENE D. TEGTMEYER

Attesting Officer

Acting Commissioner of Patents and Trademarks